(12) United States Patent
Ehlers et al.

(10) Patent No.: US 9,703,066 B2
(45) Date of Patent: Jul. 11, 2017

(54) APPARATUS FOR SELECTIVELY CONNECTING ITEMS

(71) Applicant: THE CLEVELAND CLINIC FOUNDATION, Cleveland, OH (US)

(72) Inventors: Justis P. Ehlers, Shaker Heights, OH (US); Sunil K. Srivastava, Shaker Hts., OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 520 days.

(21) Appl. No.: 14/039,077

(22) Filed: Sep. 27, 2013

(65) Prior Publication Data
US 2014/0085714 A1 Mar. 27, 2014

Related U.S. Application Data

(60) Provisional application No. 61/706,433, filed on Sep. 27, 2012.

(51) Int. Cl.
| | | |
|---|---|---|
| G02B 21/00 | (2006.01) | |
| G02B 7/02 | (2006.01) | |
| G02B 7/00 | (2006.01) | |
| G02B 21/36 | (2006.01) | |

(52) U.S. Cl.
CPC ........... *G02B 7/00* (2013.01); *G02B 21/0012* (2013.01); *G02B 21/362* (2013.01)

(58) Field of Classification Search
CPC ..... A61B 3/13; A61B 3/1225; A61B 1/00112; A61B 1/00121; G02B 7/00; G02B 7/006; G02B 7/02; G02B 7/022; G02B 7/023; G02B 7/17; G02B 21/362; G02B 21/0012; G02B 21/0028; G02B 21/24; G02B 21/26
USPC ....... 359/368, 379, 430, 474, 477, 656, 819, 359/827; 351/80, 206–208, 216, 227
See application file for complete search history.

(56) References Cited

U.S. PATENT DOCUMENTS

| | | | |
|---|---|---|---|
| 9,107,618 B2* | 8/2015 | Huening | A61B 3/1225 |
| 2011/0072543 A1* | 3/2011 | Redford | G02B 21/002 |
| | | | 850/21 |
| 2012/0162602 A1 | 6/2012 | Huening et al. | |

* cited by examiner

*Primary Examiner* — Scott J Sugarman
*Assistant Examiner* — Mustak Choudhury
(74) *Attorney, Agent, or Firm* — Tarolli, Sundheim, Covell & Tummino LLP

(57) ABSTRACT

An apparatus for selectively connecting an accessory item to a surgical microscope includes a center pivot. An adapter arm includes an adapter support having a substantially planar support body which extends laterally in an outboard direction from the center pivot and has laterally spaced inboard and outboard support regions separated by a laterally oriented centerline. The adapter arm is configured to accept at least a portion of the accessory item in a supporting relationship. An undermount adapter includes a substantially planar undermount body having laterally spaced inboard and outboard body regions separated by a laterally oriented centerline. A plurality of microscope attachment throughholes each throughhole extend through the undermount body. Each throughhole is configured to accept a fastener for securement of the undermount adapter to the surgical microscope. An arm receiver is configured to accept the adapter tongue of the adapter arm in a supporting relationship.

19 Claims, 10 Drawing Sheets

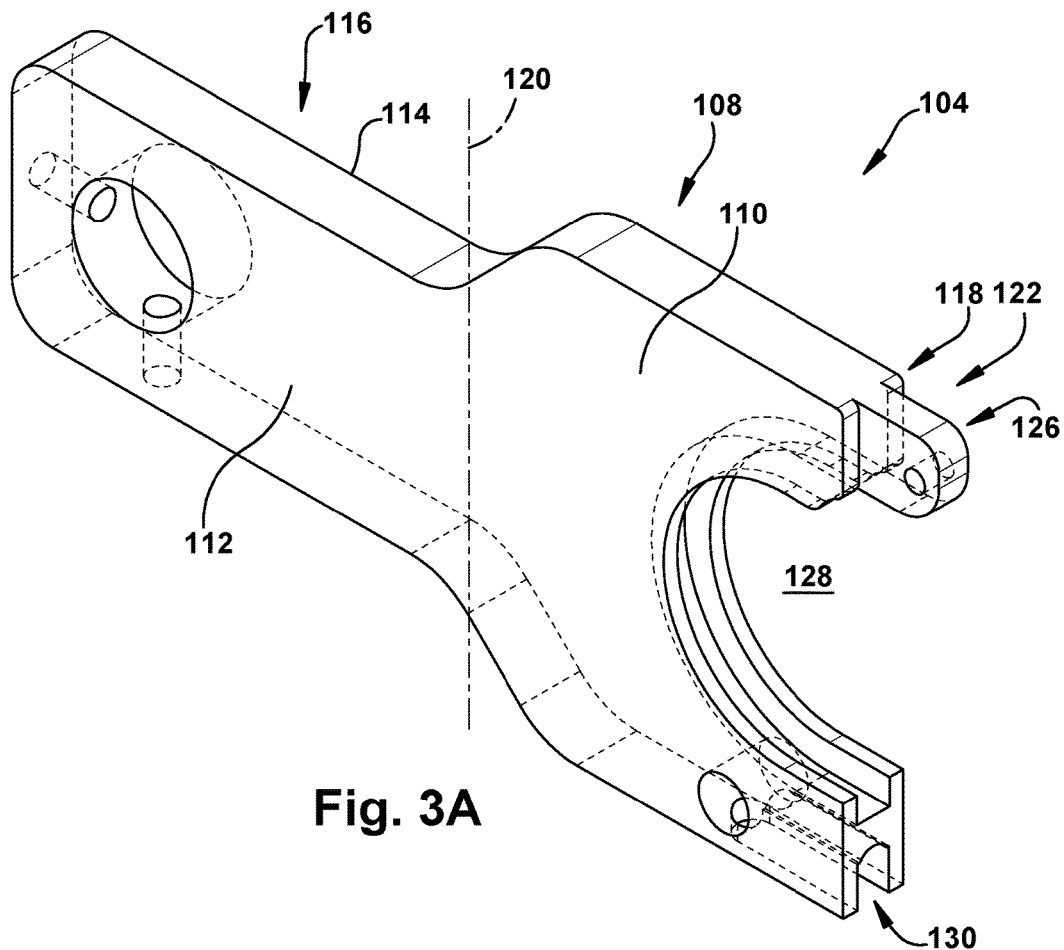
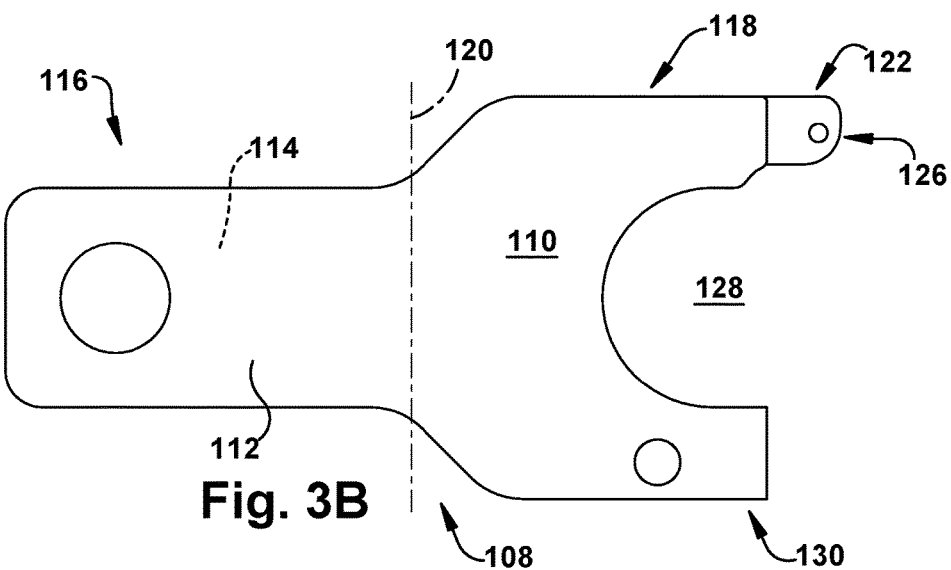

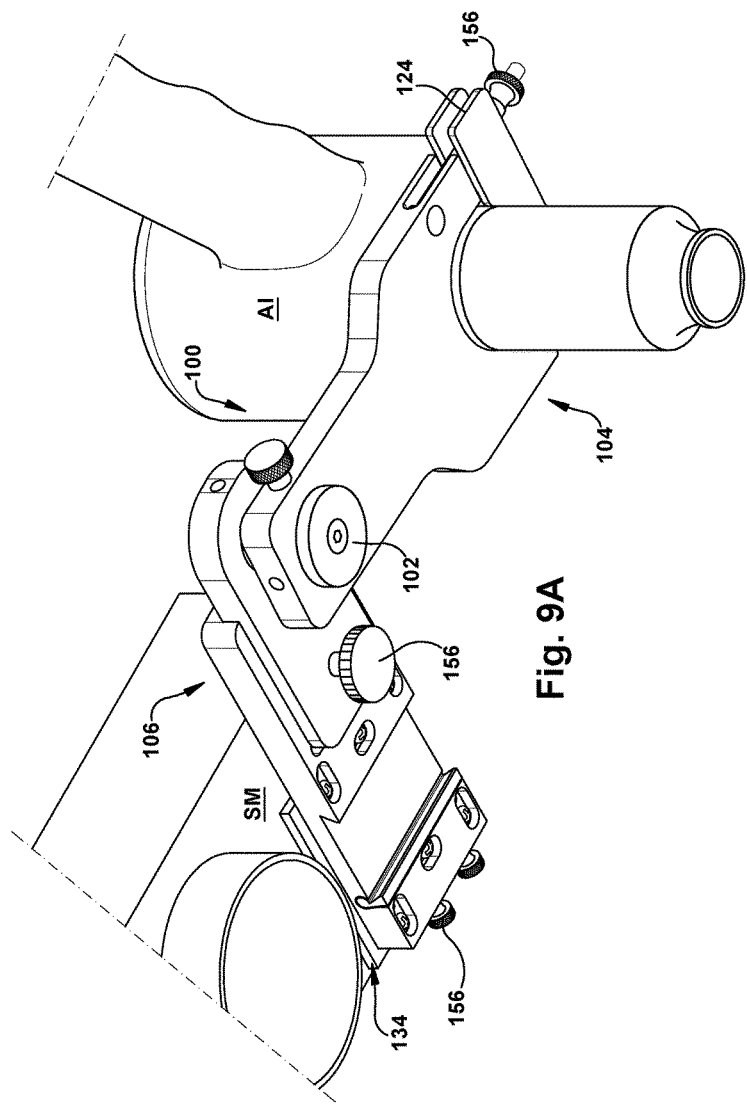

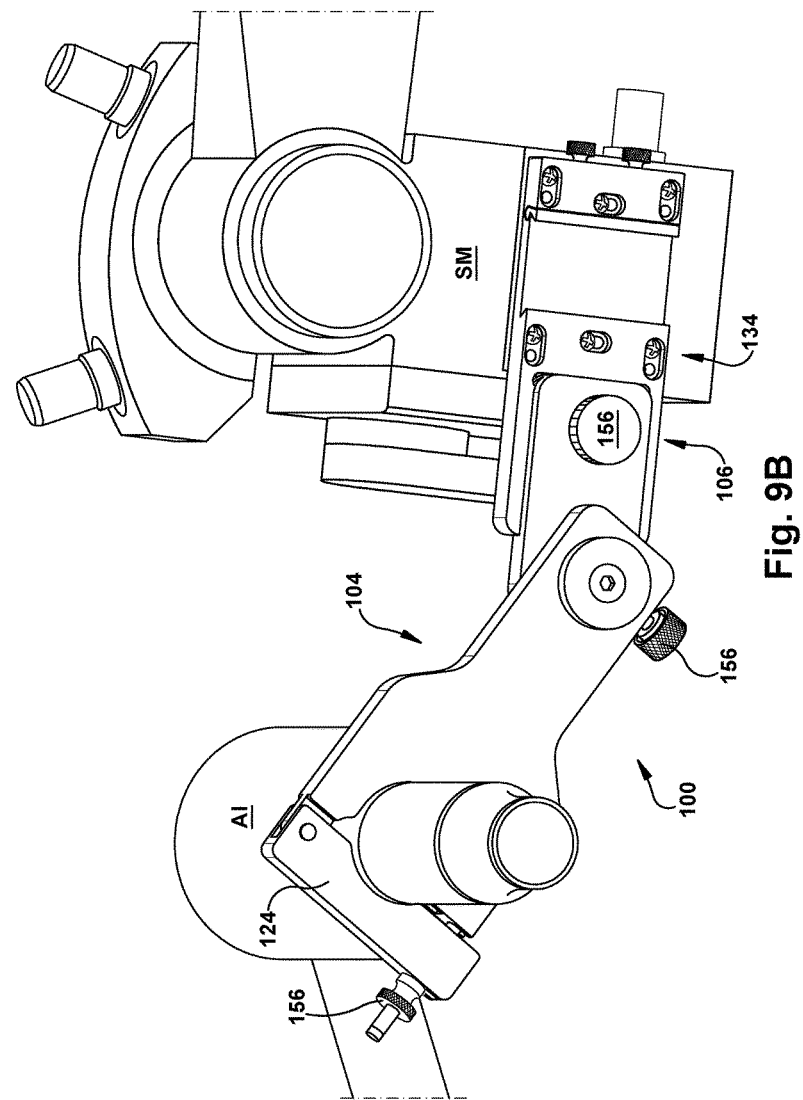

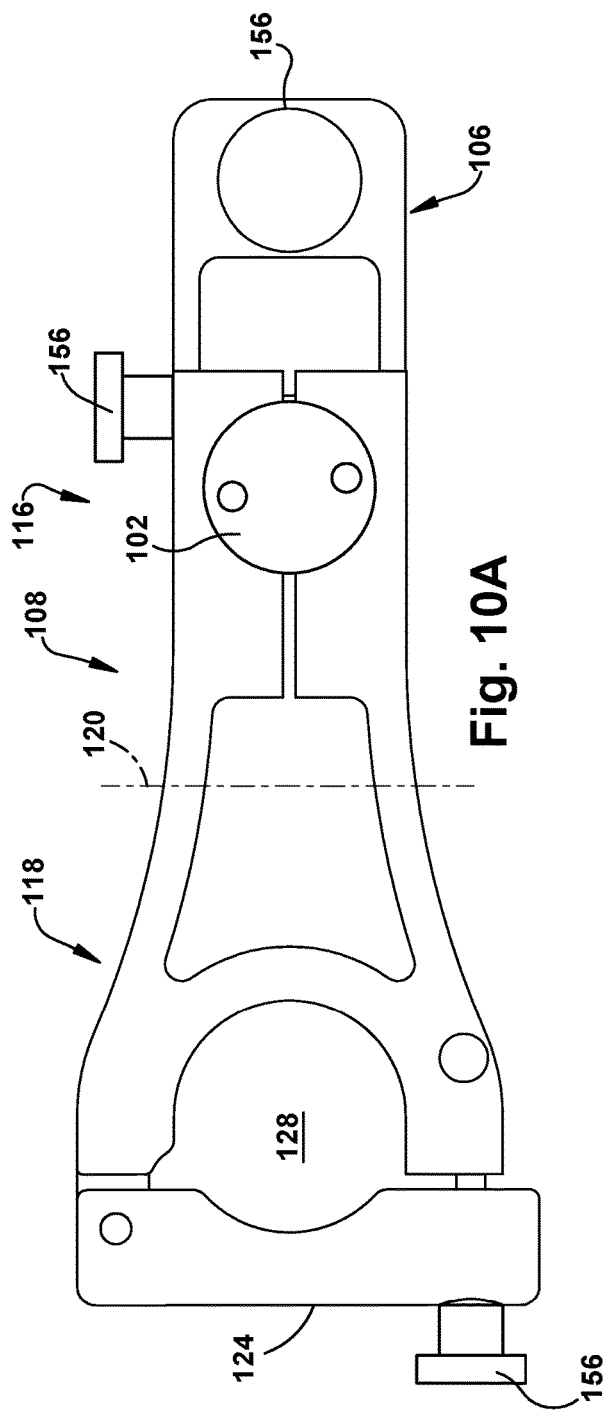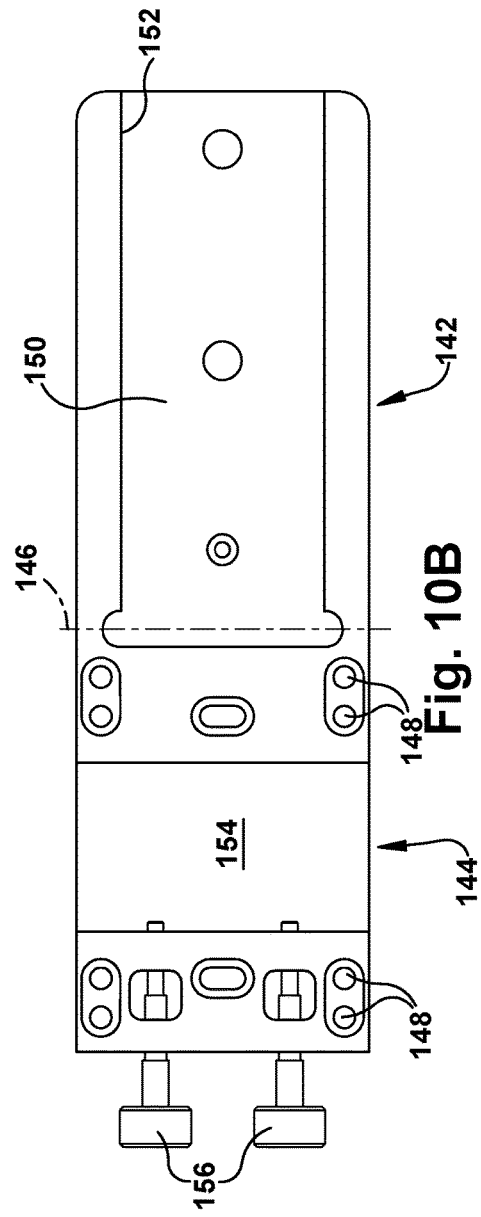

APPARATUS FOR SELECTIVELY CONNECTING ITEMS

RELATED APPLICATION

This application claims priority from U.S. Provisional Application No. 61/706,433, filed 27 Sep. 2012, the subject matter of which is incorporated herein by reference in its entirety.

TECHNICAL FIELD

The present invention relates to an apparatus and method for use of an apparatus for selectively connecting items and, more particularly, to an apparatus for selectively connecting an accessory item to a downward-facing surface of a surgical microscope.

BACKGROUND OF THE INVENTION

Surgical microscopes provide a magnified view of the operating field to the surgeon. Ophthalmic surgical microscopes are commonly stereo zoom microscopes with binocular view ports for the surgeon, and frequently have one or two observer view ports at ninety degrees (left and right) to the surgeon. The working distance between the objective lens of the microscope and the surface of a patient eye may range from about 100 mm to about 200 mm. At this working distance, which provides a suitable field of access for the manual work of the surgeon, the field of view within a patient's eye may be quite limited. It is quite common to then use an intermediate lens, such as the Oculus BIOM—Binocular Indirect Ophthalmo Microscope, available from INNOVA Medical Ophthalmics of Toronto, Ontario, Canada, to modify the focal point, magnification, and field of view for the surgeon. This intermediate lens is mounted to the undercarriage of the microscope head, and includes mechanics to adjust focus and to flip the lens into and out of the field of view of the microscope.

Other illumination or imaging devices may also be used in the surgical field. All illumination and imaging sources often would desirably be directly integrated coaxial to, and within, the optical path of the operating microscope, without impacting the operating field for the surgeon, the observers, the anesthesiologists, and other operating room personnel. Such integration is not always possible. Without full integration as such, it may still be desirable to provide a readily maneuverable mount for imaging and other accessories that is closely coupled to the surgical field, and is compatible with the mechanical controls and attributes that are already helpful for providing a well-functioning operating microscope.

A particular case of interest is the incorporation of optical coherence tomography (OCT) imaging into the surgical visualization practice. OCT provides high resolution imaging of ocular tissue microstructure, and may be used to provide information to the surgeon that will improve therapeutic outcomes and reduce the total economic burdens of surgery by reducing risk and reducing rework. The current generation of OCT, known generally as Fourier Domain OCT, provides very fast volumetric images (>30 megavoxels per second) at very high resolution (2.0 µm to 6.0 µm axial resolution, 10.0 µm to 20 µm lateral resolution). These OCT images may be helpful in visualizing the fine tissue layers and membranes that are often the subject of surgical effort. In contrast to microscope visualization, OCT provides depth-resolved images, highlighting subsurface physiology and pathology, with full volumes over a 30 to 70 degree field of view acquired in about 1 to 3 seconds. However, the alignment requirements of OCT, particularly for retina imaging and anterior segment imaging, may be quite demanding to obtain high quality images. A flexible, finely controlled, and stable imaging platform is desirable.

At present, there are no commercially available operating microscopes with integrated OCT capabilities. Handheld OCT devices are available to supplement the microscopes. However, in some embodiments, the handheld device may be relatively difficult to align and stabilize for imaging in the operating field.

SUMMARY OF THE INVENTION

In an embodiment of the present invention, an apparatus for selectively connecting an accessory item to a downward-facing surface of a surgical microscope is described. The apparatus includes a longitudinally oriented center pivot. An adapter arm includes an adapter tongue, extending laterally in an inboard direction from the center pivot. The center pivot is pivotally attached to an outboardmost portion of the adapter tongue. An adapter support has a substantially planar support body having oppositely disposed and longitudinally spaced top and bottom support surfaces. The support body extends laterally in an outboard direction from the center pivot. The adapter support has laterally spaced inboard and outboard support regions separated by a laterally oriented centerline. The adapter arm is configured to accept at least a portion of the accessory item in a supporting relationship. An undermount adapter includes a substantially planar undermount body having oppositely disposed and longitudinally spaced top and bottom undermount surfaces. The undermount body has laterally spaced inboard and outboard body regions separated by a laterally oriented centerline. A plurality of microscope attachment throughholes are located substantially in the outboard body region. Each throughhole extends between the top and bottom undermount surfaces through the undermount body. Each throughhole is configured to accept a fastener therethrough for securement of the undermount adapter to the downward-facing surface of the surgical microscope. An arm receiver is located substantially in the inboard body region and is configured to accept the adapter tongue of the adapter arm in a supporting relationship.

In an embodiment of the present invention, an apparatus for selectively connecting an accessory item to a downward-facing surface of a surgical microscope is described. The apparatus includes a longitudinally oriented center pivot. An adapter arm includes a substantially planar adapter tongue, extending laterally in an inboard direction from the center pivot. The center pivot is directly pivotally attached to an outboardmost portion of the adapter tongue. An adapter support has a substantially planar support body having oppositely disposed and longitudinally spaced top and bottom support surfaces. The support body extends laterally in an outboard direction from the center pivot and is directly pivotally attached to the center pivot. The adapter support has laterally spaced inboard and outboard support regions separated by a laterally oriented centerline. The adapter arm is configured to accept at least a portion of the accessory item in a supporting relationship. An undermount adapter includes a substantially planar undermount body having oppositely disposed and longitudinally spaced top and bottom undermount surfaces. The undermount body has laterally spaced inboard and outboard body regions separated by a laterally oriented centerline. A plurality of microscope attachment throughholes each extend between the top and bottom undermount surfaces through the undermount body. Each throughhole is configured to accept a fastener therethrough for securement of the undermount adapter to the downward-facing surface of the surgical microscope. An arm receiver is located substantially in the inboard body region and is configured to accept the adapter tongue of the adapter arm in a supporting relationship.

BRIEF DESCRIPTION OF THE DRAWINGS

For a better understanding of the invention, reference may be made to the accompanying drawings, in which:

FIG. 3A is a perspective top view of a component of the embodiment of FIG. 1;

FIG. 3B is a top view of the component of FIG. 3A;

FIG. 9A is a bottom view of the embodiment of FIG. 1 in a first configuration in an example use environment;

FIG. 9B is a bottom view of the embodiment of FIG. 1 in a first configuration in an example use environment;

FIG. 10A is a bottom view of a component of an embodiment of the present invention; and FIG. 10B is a bottom view of a component of the embodiment of the component of FIG. 10A.

DESCRIPTION OF EMBODIMENTS

Figure 1:
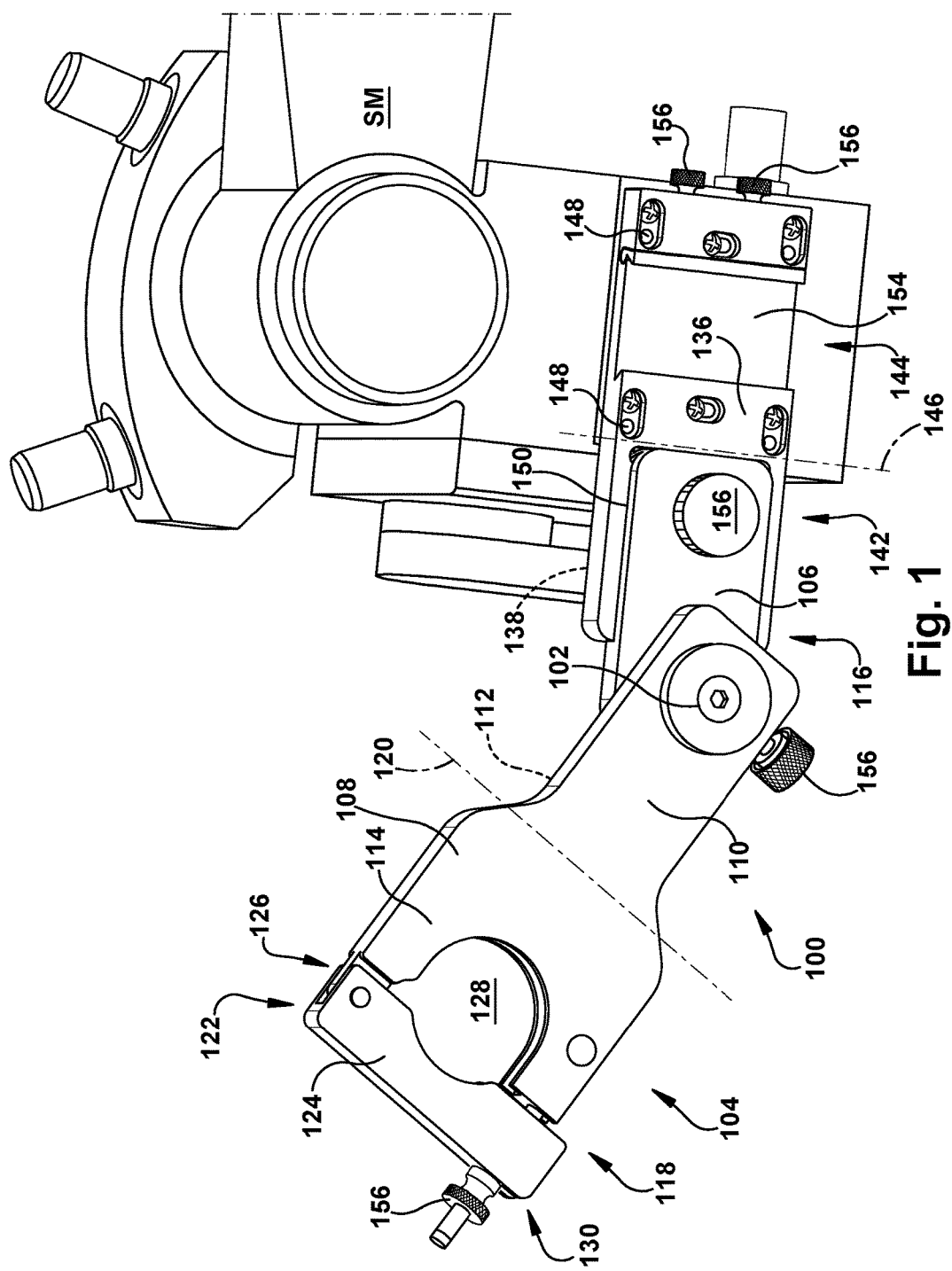
FIG. 1 is a bottom view of one embodiment of the present invention in an example use environment.
Figure 2A:
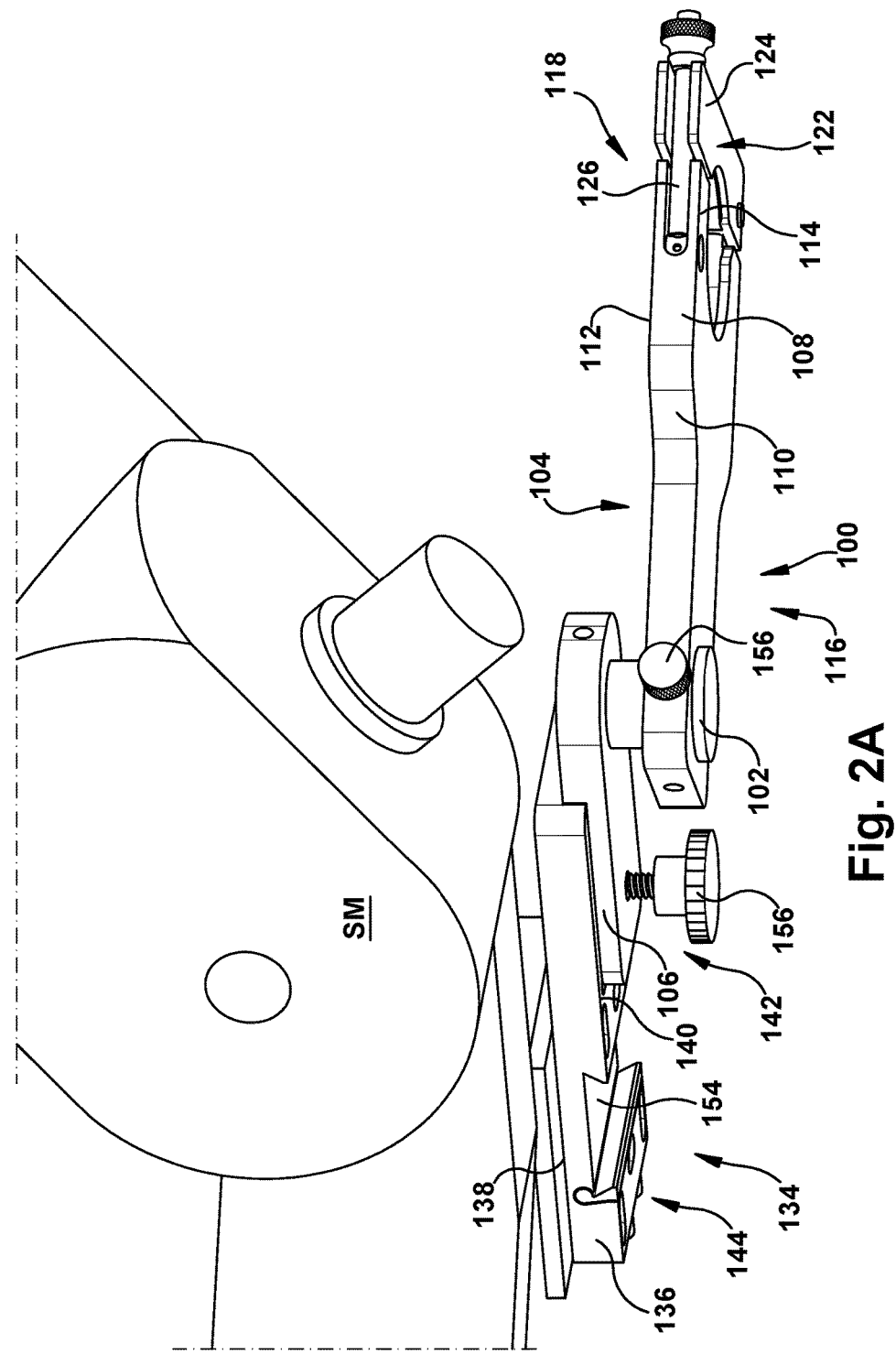
FIG. 2A is a side view of the embodiment of FIG. 1.
Figure 2B:
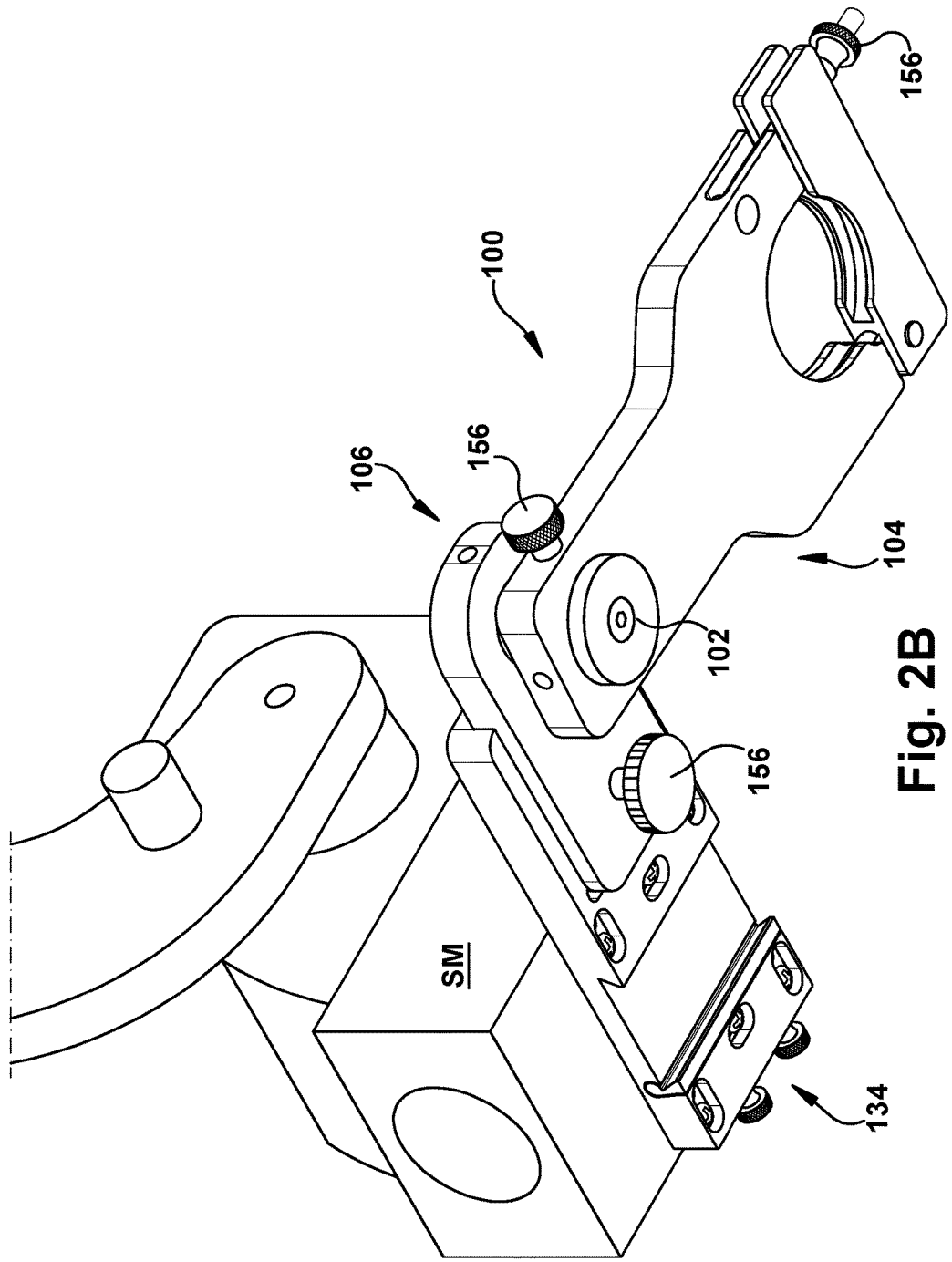
FIG. 2B is a perspective side view of the embodiment of FIG. 1.

In accordance with the present invention, FIGS. 1-2B depict an apparatus 100 for selectively connecting an accessory item Al to a downward-facing surface of a surgical microscope SM. The apparatus 100 includes a longitudinally oriented center pivot 102. "Longitudinal" herein is used to indicate a direction into and out of the plane of the page in the orientation of FIG. 1. A "lateral" direction is substantially within, or parallel to, the plane of the page in the orientation of FIG. 1.

An adapter arm 104 includes an adapter tongue 106, extending laterally in an inboard direction from the center pivot 102. The center pivot 102 is pivotally attached to an outboardmost portion of the adapter tongue 106—this pivotal attachment may be a direct pivotal attachment or there may be one or more intervening structures. In the below description, an "inboard" direction is a laterally-oriented direction which is substantially focused toward a central area of the structure of the apparatus 100, as will be further discussed below. An "outboard" direction herein is a laterally-oriented direction which is substantially focused toward the periphery of the structure of the apparatus 100, such as toward the edges of the page in the orientation of FIG. 1.

An adapter support 108 has a support body 110, which may be substantially planar, having oppositely disposed and longitudinally spaced top and bottom support surfaces 112 and 114, respectively. (Top support surface 112 is hidden from view in FIG. 1.) The support body 110 extends laterally in an outboard direction from the center pivot 102. The adapter support 108 has laterally spaced inboard and outboard support regions 116 and 118, respectively, separated by a laterally oriented centerline 120. The adapter arm 104 is configured to accept at least a portion of the accessory item Al in a supporting relationship.

Figure 4:
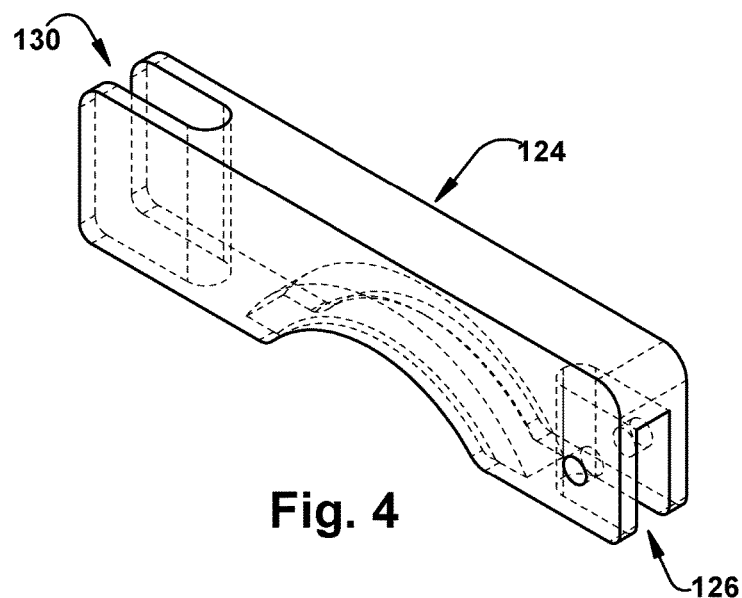
FIG. 4 is a perspective side view of a component of the embodiment of FIG. 1.

The adapter support 108 is shown in detail in FIGS. 3A-4. FIGS. 3A and 3B depict perspective and top views of the adapter support 108, respectively. As shown in the Figures, the adapter support 108 is substantially "Y"-shaped, but any desired shape may be provided that is sufficient to assist with forming the supporting relationship between the adapter arm 104 and the accessory item Al. In some embodiments of the present invention, the accessory item may be chosen from a group, such as an optical coherence tomography probe, a camera, a Doppler probe, and a wide-angle viewing system.

Regardless of the nature of the accessory item Al, some structure of the adapter arm 104 may be configured to accept a predetermined portion of the accessory item Al to create the supporting relationship. For example, the supporting relationship may be created via frictional fit, mechanical interference, chemical and/or mechanical adhesion, magnetism, or any other suitable attachment or supporting means. The embodiment of FIGS. 1-2 creates the supporting relationship via an accessory securement mechanism 122 configured to capture at least a portion of the accessory item Al between itself and a laterally inboardly located portion of the adapter support 108 to at least partially establish the supporting relationship between the accessory item Al and the adapter arm 104. For example, and as additionally shown in detail in FIGS. 3A-4, the accessory securement mechanism 122 may include a gate member 124 pivotally mounted to at least a portion of the adapter support 108, such as via the hinge joint generally shown at 126. The gate member 124 is pivotable, in a substantially lateral plane as shown in the Figures or in any other direction(s). Pivoting of the gate member 124 toward and/or away from the adapter support 108 selectively admits at least a portion of the accessory item Al laterally into the supporting relationship and to selectively blocks at least a portion of the accessory item Al from laterally exiting the supporting relationship. In other words, the gate member 124 can pivot toward or away from the adapter support 108 to "open" or "close" a laterally bounded aperture 128 defined (at least partially) by the adapter support 108 to hold at least a portion of the accessory item Al in a supporting relationship. Optionally, a structure such as the securement latch schematically shown at 130 may be used to hold the gate member 124 in position.

Figure 5A:
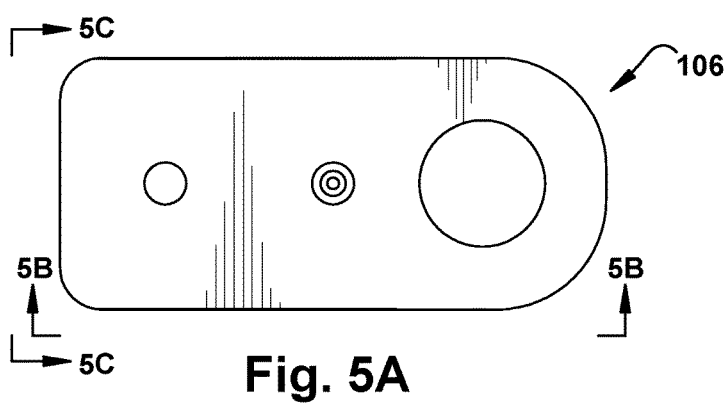
FIG. 5A is a top view of a component of the embodiment of FIG. 1.
Figure 5B:
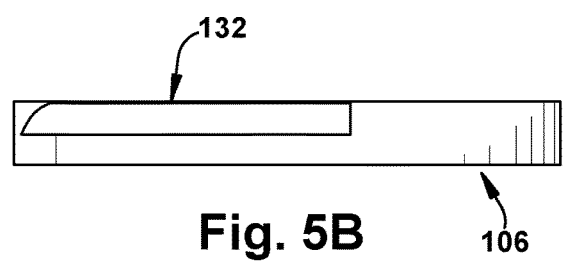
FIG. 5B is a side view of the component of FIG. 5A.
Figure 5C:
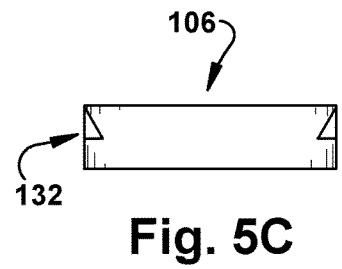
FIG. 5C is a side view of the component of FIG. 5A.

FIGS. 5A-5C depict the adapter tongue 106 in detail. The adapter tongue 106 includes a male dovetail area 132, which is used to help assemble the adapter tongue 106 into the apparatus 100, as will be discussed below. As previously mentioned, the adapter tongue 106 is pivotally attached to the center pivot 102.

Returning to FIG. 1, the apparatus 100 includes an undermount adapter 134. The undermount adapter 134 includes an undermount body 136, which may be substantially planar, having oppositely disposed and longitudinally spaced top and bottom undermount surfaces 138 and 140, respectively. (Top undermount surface 138 is hidden from view in FIG. 1.) The undermount body 136 has laterally spaced inboard and outboard body regions 142 and 144, respectively, separated by a laterally oriented centerline 146. The undermount adapter 134 is shown in more detail in FIGS. 6A-6C.

The undermount adapter 134 also includes a plurality of microscope attachment throughholes 148 (for clarity, only a few of the microscope attachment throughholes 148 are labeled in the Figures. The plurality of microscope attachment throughholes 148 may be located substantially in the outboard body region 144, with each throughhole 148 extending between the top and bottom undermount surfaces 138 and 140 through the undermount body 136. Each throughhole 148 is configured to accept a fastener therethrough for securement of the undermount adapter 134 to the downward-facing surface of a surgical microscope SM. When the plurality of microscope attachment throughholes 148 are located substantially in the outboard body region 144 (i.e., most of the throughholes 148 are located in the outboard one of two laterally adjacent halves of the undermount body 136), the inboard body region 142 will then be cantilevered outward toward one side of the surgical microscope SM when the undermount adapter 134 is secured thereto.

The plurality of microscope attachment throughholes 148 of the apparatus 100 may be configured to correspond to a particular model of surgical microscope SM (most surgical microscopes are produced with a plurality of holes and/or fasteners in a predetermined pattern on an underside thereof to facilitate any desirable attachment of other instruments and structures, to facilitate use aftermarket modifications and accessories). In FIGS. 1, 2A, and 2B, the apparatus 100 is shown attached to a surgical microscope SM in an example of a suitable use environment of the present invention. It should be noted that during attachment of a particular microscope to the apparatus 100, it is not necessary for all of the microscope attachment throughholes 148 to be utilized. Optionally, the plurality of microscope attachment throughholes 148 may be arranged upon the undermount body 136 such that a plurality of different patterns of throughholes 148 are available. In this arrangement, each pattern of throughholes 148 may include one or more of the plurality of throughholes 148, and each pattern of throughholes 148 will then correspond to an existing pattern of fastener receptacles a downward-facing surface of a particular model of surgical microscope SM. In this manner, multiple models of surgical microscopes could be used with the apparatus 100, even though the surgical microscopes themselves are configured with different patterns of holes and/or fasteners.

Figure 7:
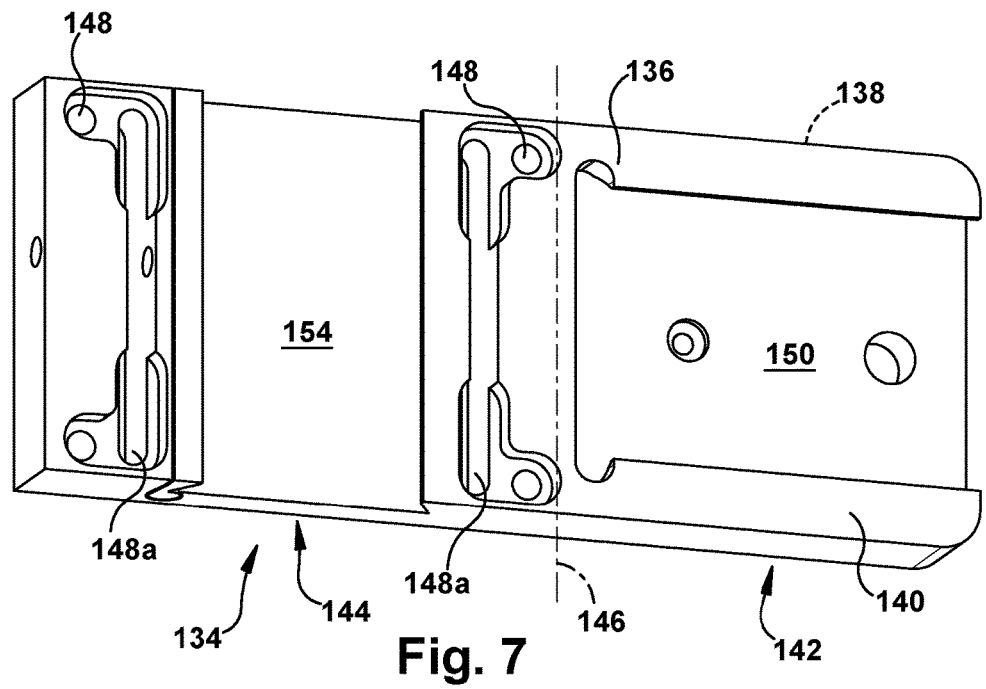
FIG. 7 is a bottom view of an alternative configuration of the component of FIG. 6A.

An example of an alternate configuration of an undermount adapter 134 is shown in FIG. 7. In this Figure, at least one throughhole 148 is in the form of an elongate aperture, such that a fastener could be passed through that elongate aperture throughhole 148a in any of a number of different lateral positions.

Returning to FIG. 6B, it is apparent that the undermount adapter 134 may be substantially laterally symmetrical about a line of symmetry substantially perpendicular to the centerline 146—that is, a line of symmetry running left to right in the orientation of FIG. 6B—such that the inboard body region 142 can selectively extend in either a leftward or a rightward direction with respect to the portion of the downward-facing surface of the surgical microscope SM to which the undermount adapter 134 is secured. For example, if the user wishes to mount an accessory item Al to the right of the portion of the downward-facing surface of the surgical microscope SM to which the undermount adapter 134 is secured, the undermount adapter 134 can be mounted to the microscope in the orientation of FIG. 6B. Conversely, if the user wishes to mount an accessory item Al to the left of the portion of the downward-facing surface of the surgical microscope SM to which the undermount adapter 134 is secured, the undermount adapter 134 can be instead mounted to the microscope in an orientation that is flipped left-to-right (e.g., mirror-imaged) from the orientation of FIG. 6B. In this way, the same undermount adapter 134 can be used for either right- or left-sided mounting, removing the necessity of handed undermount adapters 134.

Figure 8:
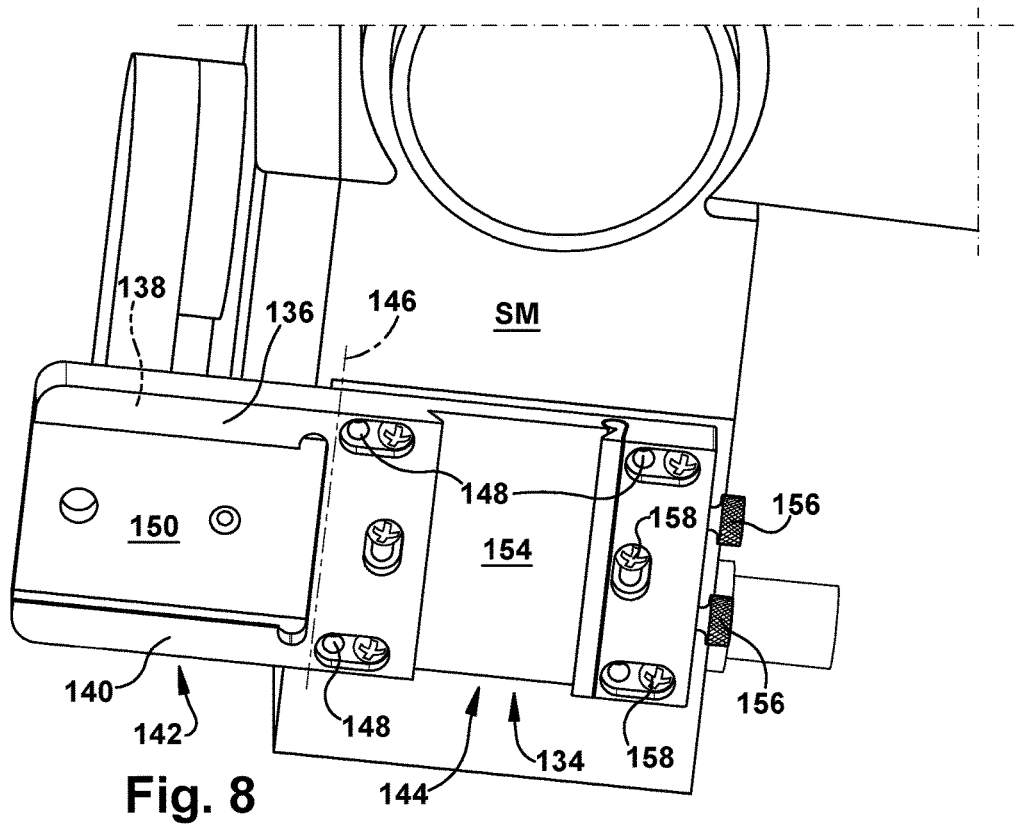
FIG. 8 is a bottom view of the embodiment of FIG. 6A in the use environment of FIG. 1.

With reference to FIG. 8, an undermount adapter 134 is shown mounted to an underside of a surgical microscope SM through the use of a plurality of fasteners 158 inserted through corresponding microscope attachment throughholes 148 and into appropriate apertures on the underside of the surgical microscope SM. Optionally, the undermount adapter 134 could be mounted to the surgical microscope SM and maintained there long-term as shown, whether or not a corresponding accessory item Al is present during even at least a portion of the maintenance of the undermount adapter 134 as shown in FIG. 8.

The undermount adapter 134 may also include an arm receiver 150, which may be located substantially in the inboard body region 142 and may be configured to accept the adapter tongue 106 of the adapter arm 104 in a supporting relationship, as shown in FIG. 1. For example, and as shown in the Figures, the arm receiver 150 may include a female dovetail area 152 configured to selectively supportingly mate with the male dovetail area 132 of the adapter arm 104. That is, the arm receiver 150 may accept the adapter tongue 106 of the adapter arm 104 in a supporting relationship facilitated by a dovetail engagement therebetween.

Figure 6A:
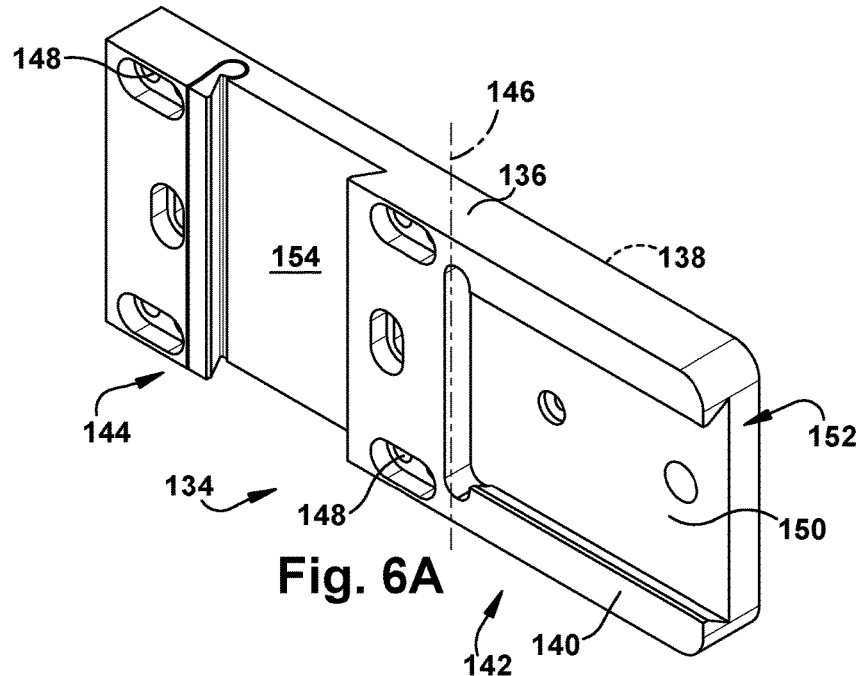
FIG. 6A is a perspective bottom view of a component of the embodiment of FIG. 1.
Figure 6B:
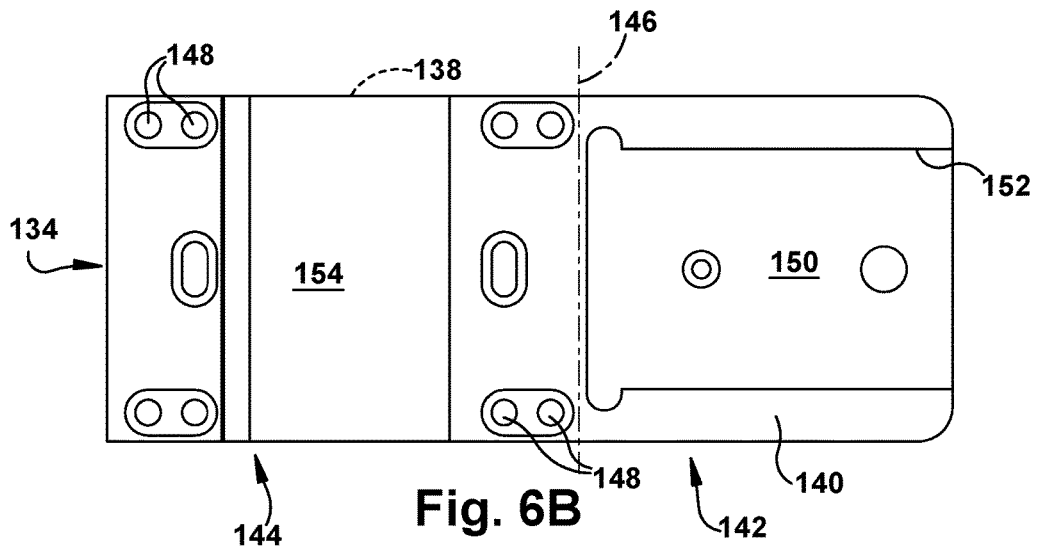
FIG. 6B is a bottom view of the component of FIG. 6A.

As shown in FIGS. 1, 6A, and 6B, the arm receiver 150 may be laterally oriented in an inboard-outboard direction (i.e., approximately left-to-right in the depicted orientations) and accept the adapter tongue 106 of the adapter arm 104 in a supporting relationship established at least partially by sliding motion of the adapter tongue 106 relative to the arm receiver 150 in a laterally outboard direction. This supporting relationship established between the arm receiver 150 and the adapter tongue 106 could be thought of as occurring approximately at a laterally central area of the structure of the apparatus 100 for the sake of description of the inboard and outboard directions.

It is contemplated that some assistive structure, such as the set screws 156 shown in the Figures, could be provided to assist with establishing and maintaining the relative relationships between components shown and described herein. The assistive structure(s), when present, could be user-manipulable (e.g., set screw 156, nib spring, friction collar, or any other suitable structure[s]) and/or at least semi-automatically engaged/disengaged (e.g., captured-ball friction mechanism or any other suitable structure[s]).

With reference to the structures depicted in the Figures and described above, the apparatus 100 can be used to selectively connect an accessory item Al to a surgical microscope SM, as shown in FIGS. 9A and 9B. The undermount adapter 134 can be attached to a downward-facing surface of the surgical microscope SM, for example, by being placed against that downward-facing surface and held there while fasteners are passed through the microscope attachment throughholes 148 and secured into corresponding holes on the downward-facing surface. Before, during, and/or after attachment of the undermount adapter 134 to the downward-facing surface of the surgical microscope SM, the adapter tongue 106 could be placed into the aforementioned supporting relationship with the arm receiver 150 to connect the adapter arm 104 to the undermount adapter 134 and thus complete formation of the apparatus 100. Before, during, and/or after establishment of the supporting relationship between the arm receiver 150 and the adapter tongue 106, an accessory item Al could be placed into a supporting relationship with the adapter arm 104, such as with the assistance of the accessory securement mechanism 122. Once the described arrangement has been achieved, the accessory item Al is then connected to the downward-facing surface of the surgical microscope SM, the accessory item Al being located toward either the right (as in FIG. 9A) or left (as in FIG. 9B) of the downward-facing surface of the surgical microscope SM, as desired and as dictated by the orientation of the undermount adapter 134 with respect to the surgical microscope SM. Optionally, and depending upon the configuration and/or orientation of the described structures, each of the attachments and connections described herein could be temporary or permanent.

Optionally, the accessory item Al may be a first accessory item Al. In this scenario, an undermount receiver 154, located substantially in an outboard body region 144, may be configured to accept at least a portion of a second accessory item Al, which may be the same as, or different from, the first accessory item Al, in a supporting relationship. When present, the undermount receiver 154 may accept at least a portion of the second accessory item Al in a supporting relationship facilitated by a dovetail engagement therebetween. The first and second accessory items may be supported respectively by the arm receiver 150 and undermount receiver 154 simultaneously or sequentially, as desired by the user.

Figure 6C:
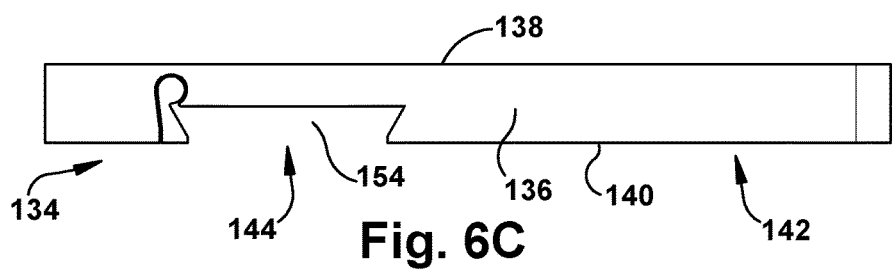
FIG. 6C is a side view of the component of FIG. 6A.

Optionally, when the undermount receiver 154 is laterally oriented in a direction substantially perpendicular to the inboard-outboard direction (as shown in FIGS. 6A-6C), the undermount receiver 154 may accept at least a portion of the second accessory item Al in a supporting relationship established at least partially by sliding motion of at least a portion of the second accessory item Al in a lateral direction substantially parallel to the lateral centerline.

FIGS. 10A and 10B depict an embodiment of the present invention similar to that of FIGS. 1-9B, but having superficial differences. Corresponding structures between the embodiment of FIGS. 10A-10B and the embodiment of FIGS. 1-9B are labeled with the same element numbers.

While aspects of the present invention have been particularly shown and described with reference to the preferred embodiment above, it will be understood by those of ordinary skill in the art that various additional embodiments may be contemplated without departing from the spirit and scope of the present invention. For example, the specific methods described above for using the described apparatus are merely illustrative; one of ordinary skill in the art could readily determine any number and type of tools, sequences of steps, or other means/options for virtually or actually placing the above-described apparatus, or components thereof, into positions and/or configurations substantially similar to those shown and described herein. The dovetail engagements shown and described herein could also or instead include any other desired permanent or temporary mutual attachment of structures, such as other types of mechanical joints/attachment features, chemical and/or mechanical adhesives, magnetic attachments, or any other desired means for attachment. The relative placement and/or orientations of the depicted and/or described male and female dovetail areas (e.g., 132 and 152) could be reversed from that shown. It is contemplated that, when the undermount adapter 134 is substantially laterally symmetrical about a line of symmetry substantially perpendicular to the centerline 146—that is, a line of symmetry running left to right in the orientation of FIG. 6B—this described symmetry may be the only symmetry present in the undermount adapter 134. Any of the described structures and components could be integrally formed as a single piece or made up of separate sub-components, with either of these formations involving any suitable stock or bespoke components and/or any suitable material or combinations of materials. Though certain components described herein are shown as having specific geometric shapes, all structures of the present invention may have any suitable shapes, sizes, configurations, relative relationships, cross-sectional areas, or any other physical characteristics as desirable for a particular application of the present invention. The terms "inboard", "outboard", and "centerline" are used herein to indicate general areas of the described structures, but one of ordinary skill in the art will understand that these terms are used approximately herein unless otherwise noted and will allow for nonmaterial variation in the regions and structures substantially described as such. Any structures or features described with reference to one embodiment or configuration of the present invention could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of the present invention as determined based upon the claims below and any equivalents thereof.

Other aspects, objects, and advantages of the present invention can be obtained from a study of the drawings, the disclosure, and the appended claims.

Having described the invention, we claim:

1. An apparatus for selectively connecting an accessory item to a downward-facing surface of a surgical microscope, the apparatus comprising: a longitudinally oriented center pivot; an adapter arm, including an adapter tongue, extending laterally in an inboard direction from the center pivot, the center pivot being pivotally attached to an outboardmost portion of the adapter tongue, and an adapter support having a planar support body having oppositely disposed and longitudinally spaced top and bottom support surfaces, the support body extending laterally in an outboard direction from the center pivot, the adapter support having laterally spaced inboard and outboard support regions separated by a laterally oriented centerline, wherein the adapter arm is configured to accept at least a portion of the accessory item in a supporting relationship; and an undermount adapter, including a planar undermount body having oppositely disposed and longitudinally spaced top and bottom undermount surfaces, the undermount body having laterally spaced inboard and outboard body regions separated by a laterally oriented centerline, a plurality of microscope attachment throughholes, the plurality of microscope attachment throughholes being located in the outboard body region, each throughhole extending between the top and bottom undermount surfaces through the undermount body, and each throughhole being configured to accept a fastener therethrough for securement of the undermount adapter to the downward-facing surface of the surgical microscope, and an arm receiver, located in the inboard body region and configured to accept the adapter tongue of the adapter arm in a supporting relationship; wherein the undermount adapter is laterally symmetrical about a line of symmetry perpendicular to the centerline, such that the inboard body region can be selectively extending in either a leftward or a rightward direction with respect to the portion of the downward-facing surface of the surgical microscope to which the undermount adapter is secured.

2. The apparatus of claim 1, wherein the accessory item is chosen from a group consisting of an optical coherence tomography probe, a camera, a Doppler probe, and a wide-angle viewing system.

3. The apparatus of claim 1, wherein the outboard support region includes an accessory securement mechanism configured to capture at least a portion of the accessory item between itself and a laterally inboardly located portion of the adapter support to at least partially establish the supporting relationship between the accessory item and the adapter arm.

4. The apparatus of claim 3, wherein the accessory securement mechanism includes a gate member pivotally mounted to at least a portion of the adapter support, the gate member being pivotable in a substantially lateral plane to selectively admit at least a portion of the accessory item laterally into the supporting relationship and to selectively block at least a portion of the accessory item from laterally exiting the supporting relationship.

5. The apparatus of claim 1, wherein the accessory item is a first accessory item, and wherein an undermount receiver, located substantially in an outboard body region, is configured to accept at least a portion of a second accessory item in a supporting relationship.

6. The apparatus of claim 1, wherein the arm receiver accepts the adapter tongue of the adapter arm in a supporting relationship facilitated by a dovetail engagement therebetween.

7. The apparatus of claim 1, wherein the arm receiver is laterally oriented in an inboard-outboard direction and accepts the adapter tongue of the adapter arm in a supporting relationship established at least partially by sliding motion of the adapter tongue in a laterally outboard direction.

8. The apparatus of claim 7, wherein the accessory item is a first accessory item, and wherein an undermount receiver, located substantially in an outboard body region, is configured to accept at least a portion of a second accessory item in a supporting relationship.

9. The apparatus of claim 8, wherein the undermount receiver accepts at least a portion of the second accessory item in a supporting relationship facilitated by a dovetail engagement therebetween.

10. The apparatus of claim 8, wherein the undermount receiver is laterally oriented in a direction substantially perpendicular to the inboard-outboard direction and accepts at least a portion of the second accessory item in a supporting relationship established at least partially by sliding motion of at least a portion of the second accessory item in a lateral direction substantially parallel to the lateral centerline.

11. The apparatus of claim 1, wherein the plurality of microscope attachment throughholes are arranged upon the undermount body such that a plurality of different patterns of throughholes are available, each pattern of throughholes including one or more of the plurality of throughholes, and each pattern of throughholes corresponding to an existing pattern of fastener receptacles of a downward-facing surface of a particular model of surgical microscope.

12. An apparatus for selectively connecting an accessory item to a downward-facing surface of a surgical microscope, the apparatus comprising:
a longitudinally oriented center pivot; an adapter arm, including a planar adapter tongue, extending laterally in an inboard direction from the center pivot, the center pivot being directly pivotally attached to an outboard-most portion of the adapter tongue, and an adapter support having a planar support body having oppositely disposed and longitudinally spaced top and bottom support surfaces, the support body extending laterally in an outboard direction from the center pivot and being directly pivotally attached to the center pivot, the adapter support having laterally spaced inboard and outboard support regions separated by a laterally oriented centerline, wherein the adapter arm is configured to accept at least a portion of the accessory item in a supporting relationship; and an undermount adapter, including a planar undermount body having oppositely disposed and longitudinally spaced top and bottom undermount surfaces, the undermount body having laterally spaced inboard and outboard body regions separated by a laterally oriented centerline, a plurality of microscope attachment throughholes, each throughhole extending between the top and bottom undermount surfaces through the undermount body, and each throughhole being configured to accept a fastener therethrough for securement of the undermount adapter to the downward-facing surface of the surgical microscope, and an arm receiver, located in the inboard body region and configured to accept the adapter tongue of the adapter arm in a supporting relationship; wherein the undermount adapter is laterally symmetrical about a line of symmetry perpendicular to the centerline, such that the inboard body region can be selectively extending in either a leftward or a rightward direction with respect to the portion of the downward-facing surface of the surgical microscope to which the undermount adapter is secured.

13. The apparatus of claim 12, wherein the accessory item is chosen from a group consisting of an optical coherence tomography probe, a camera, a Doppler probe, and a wide-angle viewing system.

14. The apparatus of claim 12, wherein the outboard support region includes an accessory securement mechanism configured to capture at least a portion of the accessory item between itself and a laterally inboardly located portion of the adapter support to at least partially establish the supporting relationship between the accessory item and the adapter arm.

15. The apparatus of claim 12, wherein the arm receiver is laterally oriented in an inboard-outboard direction and accepts the adapter tongue of the adapter arm in a supporting relationship established at least partially by sliding motion of the adapter tongue in a laterally outboard direction.

16. The apparatus of claim 12, wherein the accessory item is a first accessory item, and wherein an undermount receiver, located substantially in an outboard body region, is configured to accept at least a portion of a second accessory item in a supporting relationship.

17. The apparatus of claim 16, wherein the undermount receiver is laterally oriented in a direction substantially perpendicular to the inboard-outboard direction and accepts at least a portion of the second accessory item in a supporting relationship established at least partially by sliding motion of at least a portion of the second accessory item in a lateral direction substantially parallel to the lateral centerline.

18. The apparatus of claim 12, wherein the plurality of microscope attachment throughholes are arranged upon the undermount body such that a plurality of different patterns of throughholes are available, each pattern of throughholes including one or more of the plurality of throughholes, and each pattern of throughholes corresponding to an existing pattern of fastener receptacles of a downward-facing surface of a particular model of surgical microscope.

19. The apparatus of claim 12, wherein the plurality of microscope attachment throughholes are located substantially in the outboard body region.

* * * * *